US008151512B2

(12) United States Patent
Latschaw (10) Patent No.: US 8,151,512 B2
(45) Date of Patent: Apr. 10, 2012

(54) FLYING BIRD REPLICA (76) Inventor: Ron Latschaw, Grants Pass, OR (US)

( * ) Notice: Subject to any disclaimer, the term of this patent is extended or adjusted under 35 U.S.C. 154(b) by 238 days.

(21) Appl. No.: 12/402,382

(22) Filed: Mar. 11, 2009

(65) Prior Publication Data
US 2009/0229163 A1 Sep. 17, 2009

Related U.S. Application Data (60) Provisional application No. 61/035,687, filed on Mar. 11, 2008.

(51) Int. Cl.
*A01M 31/06* (2006.01)
(52) U.S. Cl. .................... 43/3; 43/2
(58) Field of Classification Search .............. 43/2, 3
See application file for complete search history.

(56) References Cited

U.S. PATENT DOCUMENTS

| | | | | |
|---|---|---|---|---|
| 407,142 A * | 7/1889 | Wobito | | 43/2 |
| 740,293 A * | 9/1903 | Loeble | | 43/3 |
| 2,663,108 A * | 12/1953 | Dixon et al. | | 43/3 |
| 2,691,233 A * | 10/1954 | Richardson | | 43/3 |
| 2,752,715 A * | 7/1956 | Miller | | 43/3 |
| 2,787,074 A * | 4/1957 | Miller | | 43/3 |
| 2,849,823 A * | 9/1958 | Miller | | 43/3 |
| 3,435,550 A * | 4/1969 | Carlson | | 43/3 |
| 3,537,205 A * | 11/1970 | Robert | | 43/3 |
| 3,736,688 A * | 6/1973 | Caccamo | | 43/3 |
| 3,768,192 A * | 10/1973 | Caccamo | | 43/3 |
| 4,228,977 A * | 10/1980 | Tanaka | | 43/2 |
| 4,356,928 A * | 11/1982 | Stafford | | 43/3 |
| 4,620,385 A * | 11/1986 | Carranza et al. | | 43/3 |
| 5,144,764 A * | 9/1992 | Peterson | | 43/3 |
| 5,191,730 A * | 3/1993 | Balmer | | 43/3 |
| 5,231,780 A * | 8/1993 | Gazalski | | 43/3 |
| 5,375,363 A * | 12/1994 | Higdon | | 43/3 |
| 5,392,554 A * | 2/1995 | Farstad et al. | | 43/3 |
| 5,524,851 A | 6/1996 | Huang | | |
| 5,809,683 A * | 9/1998 | Solomon | | 43/3 |
| 5,960,577 A * | 10/1999 | Walterson | | 43/3 |
| 6,095,458 A * | 8/2000 | Cripe | | 43/3 |
| 6,170,188 B1 * | 1/2001 | Mathews | | 43/3 |
| 6,289,626 B1 * | 9/2001 | Williams | | 43/2 |
| 6,293,042 B1 * | 9/2001 | Arvanitis et al. | | 43/3 |
| 6,311,425 B1 * | 11/2001 | Capps | | 43/3 |
| 6,349,902 B1 * | 2/2002 | Cripe | | 43/3 |
| 6,408,559 B2 * | 6/2002 | Mathews | | 43/3 |

(Continued)

FOREIGN PATENT DOCUMENTS

AU    A-35346/84    * 5/1985

(Continued)

*Primary Examiner* — Darren W Ark (74) *Attorney, Agent, or Firm* — Brian Beverly; Beeson Skinner Beverly, LLP (57) ABSTRACT

A flying bird replica comprising a body and a pair of wing members. The body is elongated having a configuration resembling that of a bird body. The body has a top surface, two sides, and a transverse slot extending between the sides. The wing members are interconnected by a flexible cord disposed in the slot below the top surface of the body. The cord is tensioned for urging the wing members together such that the wing members are held in a fixed position relative to the body. A horizontal support rod holds the body and wing members in a realistic orientation and permits tilting of the body and wings about the support rod to resemble a bird in flight.

19 Claims, 11 Drawing Sheets

U.S. PATENT DOCUMENTS

| | | | |
|---|---|---|---|
| 6,430,863 B1 * | 8/2002 | Krag | 43/3 |
| 6,449,894 B1 * | 9/2002 | Price et al. | 43/3 |
| 6,484,431 B2 * | 11/2002 | Price et al. | 43/3 |
| 6,493,980 B1 * | 12/2002 | Richardson et al. | 43/3 |
| 6,508,028 B1 * | 1/2003 | Crowe | 43/3 |
| 6,574,902 B1 | 6/2003 | Conger | |
| 6,574,904 B1 * | 6/2003 | Fencel et al. | 43/3 |
| 6,640,483 B2 | 11/2003 | Nelson | |
| 6,665,975 B2 * | 12/2003 | Porter | 43/3 |
| 6,675,522 B2 * | 1/2004 | Mathews | 43/3 |
| 6,698,132 B1 | 3/2004 | Brint | |
| 6,715,228 B1 * | 4/2004 | Price | 43/3 |
| 6,807,765 B2 | 10/2004 | Watermann | |
| 6,957,509 B2 | 10/2005 | Wright | |
| 7,028,429 B1 * | 4/2006 | Druliner | 43/3 |
| 7,131,230 B1 * | 11/2006 | Gilsdorf | 43/3 |
| 7,137,221 B2 | 11/2006 | Highby et al. | |
| 7,272,906 B1 * | 9/2007 | Spaulding, Sr. | 43/3 |
| 7,536,823 B2 * | 5/2009 | Brint | 43/3 |
| 7,739,826 B1 * | 6/2010 | Druliner | 43/3 |
| 7,908,785 B2 * | 3/2011 | Allen et al. | 43/3 |
| 7,937,881 B2 * | 5/2011 | Price | 43/3 |
| 2002/0069572 A1 | 6/2002 | Price, Sr. et al. | |
| 2003/0208944 A1 * | 11/2003 | Olson et al. | 43/3 |
| 2004/0025400 A1 * | 2/2004 | Salato | 43/3 |
| 2004/0237373 A1 | 12/2004 | Coleman | |
| 2005/0138855 A1 * | 6/2005 | Jensen | 43/3 |
| 2005/0252066 A1 * | 11/2005 | Couvillion, III | 43/3 |
| 2007/0137092 A1 | 6/2007 | Butz | |
| 2009/0241401 A1 * | 10/2009 | Price | 43/3 |
| 2009/0260274 A1 * | 10/2009 | Rogers | 43/2 |
| 2011/0088307 A1 * | 4/2011 | Rice | 43/3 |
| 2011/0203154 A1 * | 8/2011 | Price | 43/3 |

FOREIGN PATENT DOCUMENTS

| | | |
|---|---|---|
| DE | 20318067 U1 * | 8/2004 |
| EP | 0071461 A1 * | 2/1983 |
| FR | 2671691 A1 * | 7/1992 |
| GB | 398967 * | 9/1933 |
| GB | 2067064 A * | 7/1981 |
| GB | 2124464 A * | 2/1984 |
| GB | 2441103 A * | 2/2008 |
| WO | WO 97/30585 A1 * | 8/1997 |
| WO | WO 03059058 A1 * | 7/2003 |

* cited by examiner

FLYING BIRD REPLICA

This application claims the benefit of U.S. Provisional Application No. 61/035,687, filed Mar. 11, 2008.

FIELD OF THE INVENTION

This invention is directed to a replica of a flying bird, and particularly to a replica that is light weight, sturdy, easily assembled and disassembled, and capable of motion realistically depicting a bird in flight.

BACKGROUND

The use of bird replicas as hunting decoys is well known. A substantial amount of ingenuity has been applied to creating bird decoys that realistically depict waterfowl and other birds of interest to hunters and bird watchers. Particular attention has been paid in the most recent generation of decoys to creating bird replicas that realistically represent a bird in active flight in order to maximize the appearance of safety to overflying wildfowl.

In addition to the established use of bird replicas as decoys, replicas of raptors are commonly used as deterrents to discourage the presence of unwanted birds such as pigeons and seagulls in a variety of settings such as buildings and vessels, and also in agricultural environments where they are used to ward off rodents and other pests.

One problem with the existing art is that wildfowl eventually become inured to bird replicas whether the replicas are acting as an attractive decoy or as a deterrent. Another problem is that many replicas, particularly decoys, are bulky, awkward to handle, heavy, and expensive to manufacture. Moreover, some require complicated assembly and disassembly procedures which must frequently be performed under adverse environmental conditions in the field.

Any bird replica which can realistically depict the natural movements of a bird in flight and avoid the above disadvantages will serve many useful needs.

BRIEF DESCRIPTION OF THE ILLUSTRATIONS

DESCRIPTION OF THE ILLUSTRATED EMBODIMENT

Figure 1A:
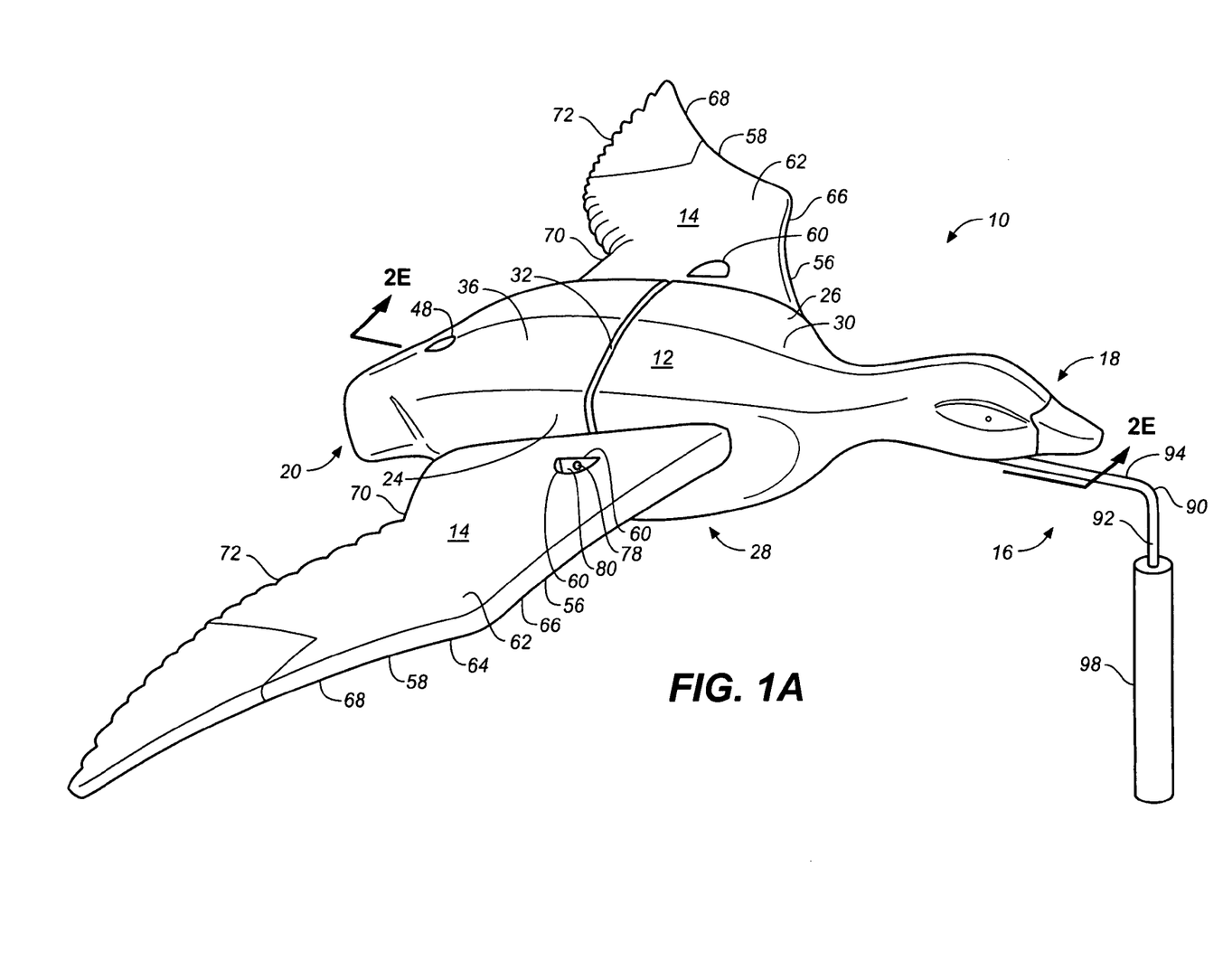
FIG. 1A is an upper perspective view of a flying bird replica according to the invention.

A flying bird replica, indicated generally at 10 in FIG. 1A, comprises a body 12, a pair of wing members 14, and a support apparatus 16. With additional reference to FIG. 2, the body 12 is elongated in form, having head and tail ends 18, 20, and left 22, right 24, upper 26, and lower 28 sides. The left and right sides 22, 24 of the body 12 each have a wing opening 30 in the form of a longitudinally extending recess having horizontally disposed top and bottom receiving walls 31 extending inwardly from said sides. A transverse slot 32 extends between the left and right sides 22, 24 of the body 12 and intersects with each recess 30. As seen in FIGS. 2E-2G, slot 32 is defined by two opposing side walls 34 that extend downward from the top surface 36 of the upper side 26 of the body 12, and a floor 40. It is contemplated that both the depth of the slot 32 and the shape or profile of the floor 40 may vary. As shown in FIGS. 2A-2B, the floor 40 of the slot 32 has two outer ends 38 adjacent the sides 22, 24 of the body 12, and a middle section 42 disposed between the two outer ends 38. The middle section 42 is higher than the outer ends 38 and may optionally have a convex profile.

Figure 1B:
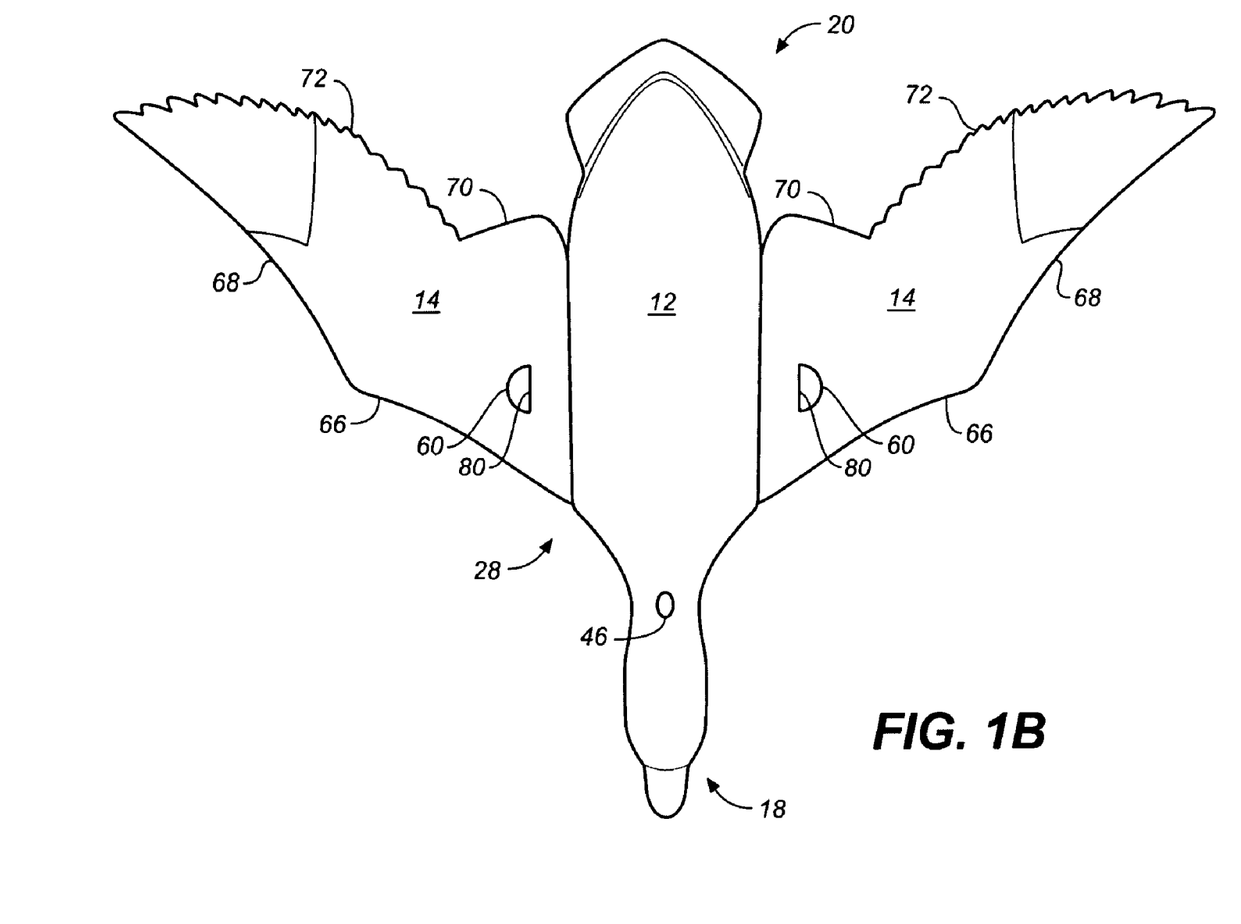
FIG. 1B is a bottom plan view of the body and wing members of the flying bird replica shown in FIG. 1A.

A hollow channel 44 extends through the body 12 longitudinally from a forward opening 46 below the head end 18, shown in FIG. 1B, to a rear opening 48 in the top surface 36, near the tail end 20 of the body 12, shown in FIG. 1A. Referring back to FIG. 2E, the channel 44 is substantially coincident with a plane bisecting the body 12 into lateral halves. In the illustrated embodiment, the channel 44 is disposed at an angle of about nine degrees relative to a longitudinal axis A extending between the head 18 and tail 20 ends of the body 12 to realistically simulate the body tilt of a bird in flight. In alternate embodiments, channel 44 may be disposed at an angle of between zero and thirty-five degrees relative to axis A, but preferably at an angle between approximately five and fifteen degrees. The hollow channel 44 is disposed somewhat higher than the longitudinal center of gravity such that the portion of the body 12 below the channel 44 is heavier than the portion of the body 12 above the channel 44.

A wear-resistant tube 50 having a front 52 and rear 54 end lines a substantial length of the channel 44. The rear end 54 of the tube 50 is disposed in the channel 44 below the top surface 36 of the body 12.

Figure 2:
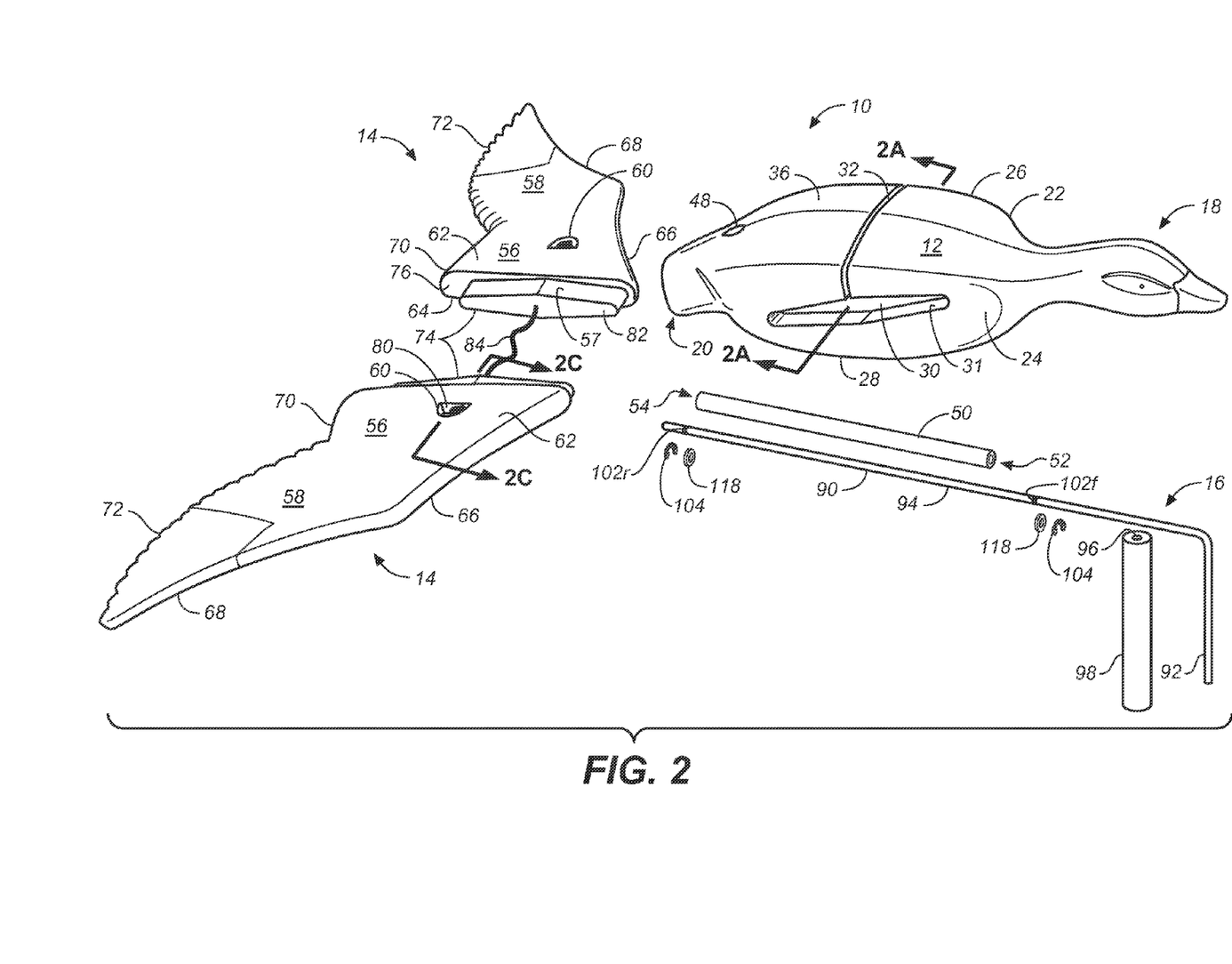
FIG. 2 is an exploded upper perspective view of the flying bird replica shown in FIG. 1A.
Figure 2A:
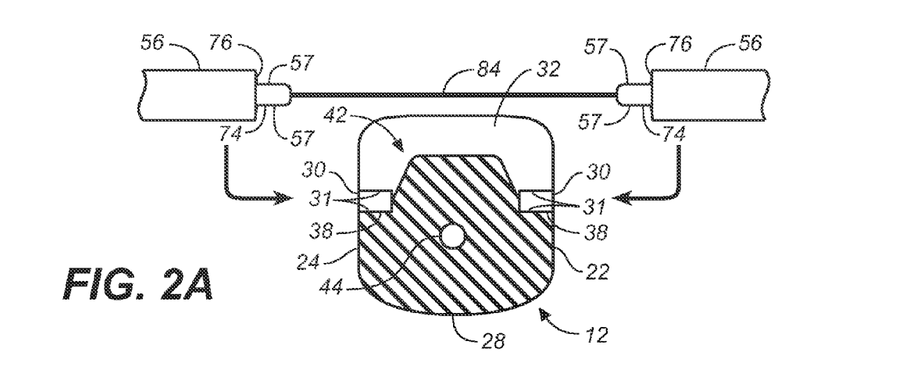
FIG. 2A is a cross-sectional view of the body of the flying bird replica shown in FIG. 2 taken along lines 2A-2A, and of the proximate portions of the wing members thereof interconnected by a flexible cord.
Figure 2B:
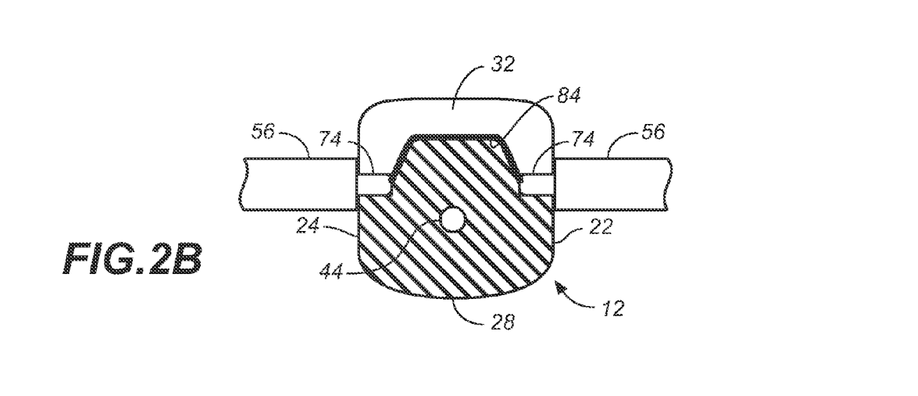
FIG. 2B is a partial cross-sectional view of a flying bird replica similar to that shown in FIG. 2A showing the wing members attached to the body.
Figure 2C:
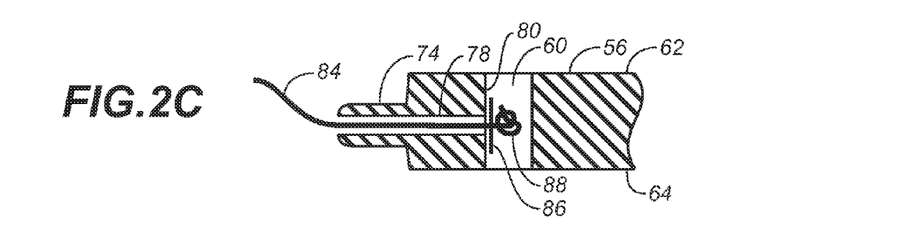
FIG. 2C is a sectional elevational view of the proximate portion of a wing of the flying bird replica shown in FIG. 2 taken along lines 2C-2C.
Figure 2D:
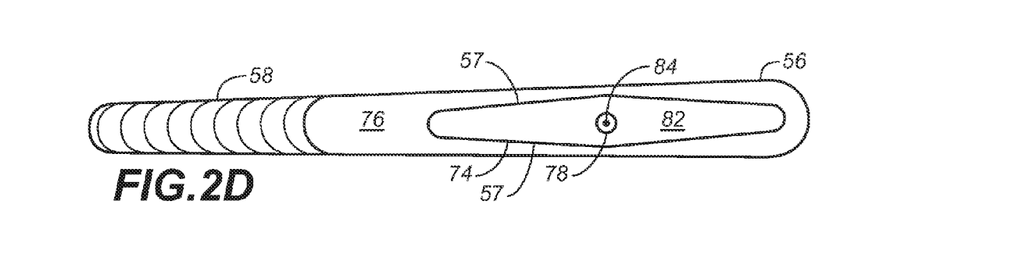
FIG. 2D is a side elevational view of the wing apart from the body of the flying bird replica.
Figure 2E:
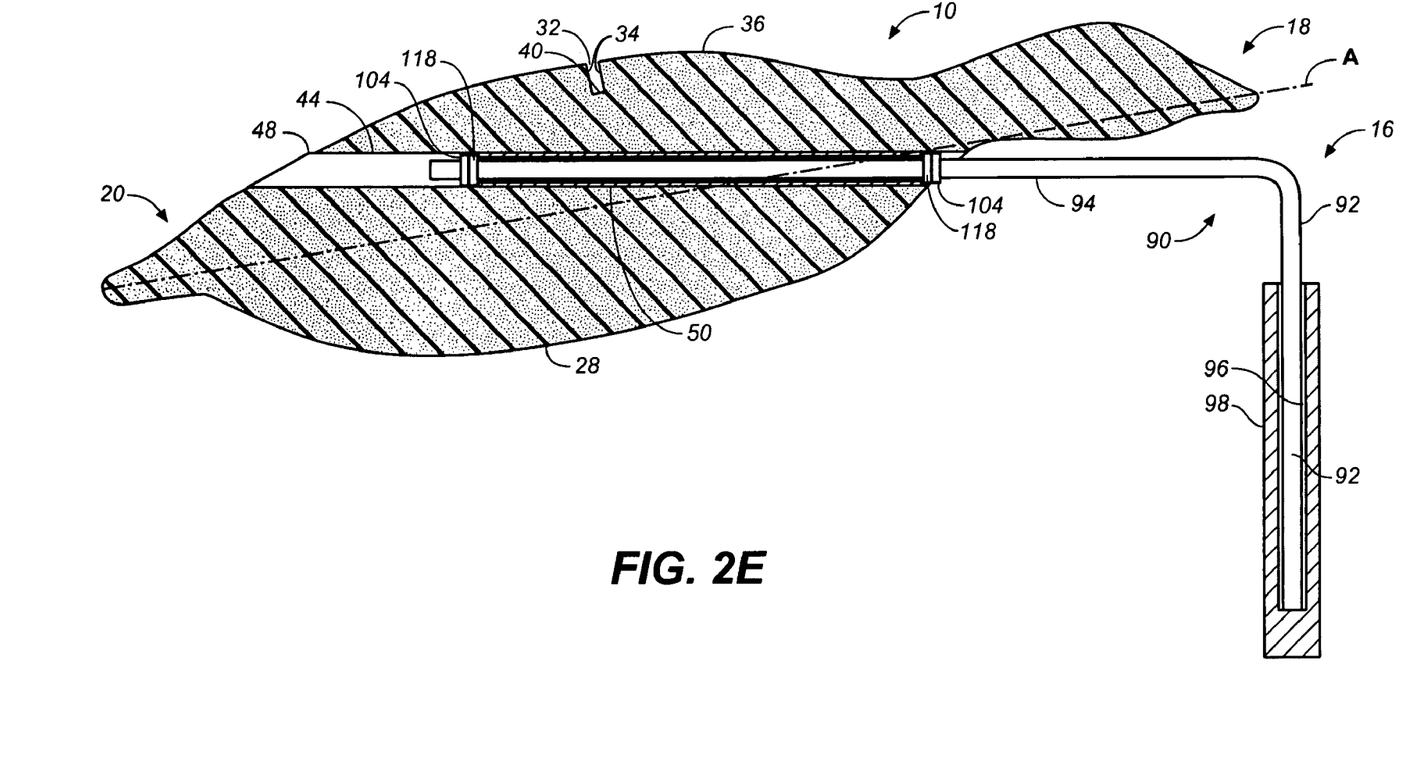
FIG. 2E is a longitudinal sectional elevational view of the body of the flying bird replica shown in FIG. 1A taken along lines 2E-2E.
Figure 2F:
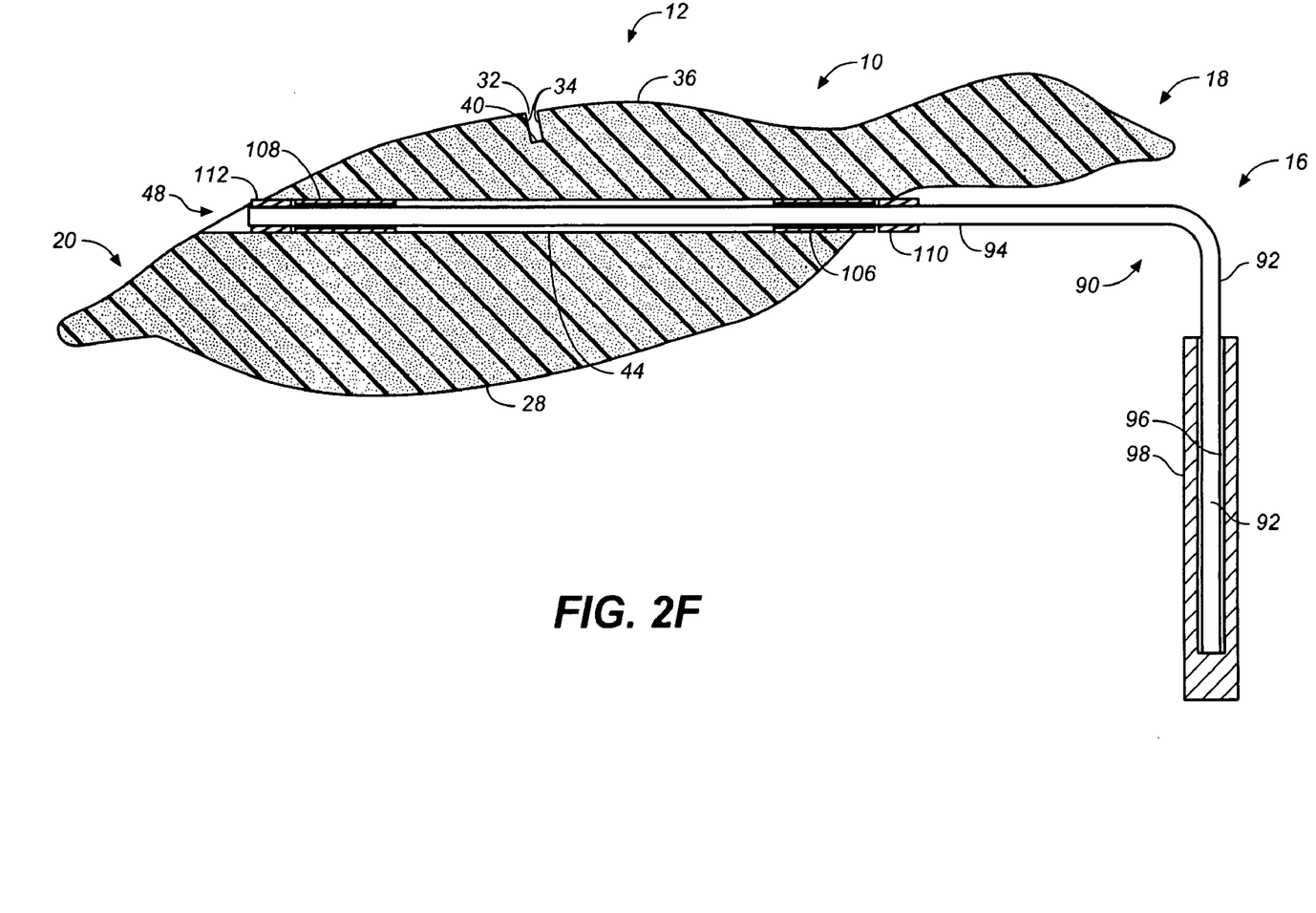
FIG. 2F is a longitudinal sectional elevational view another embodiment of the invention having alternate means for limiting longitudinal movement of the body along a support member.
Figure 2G:
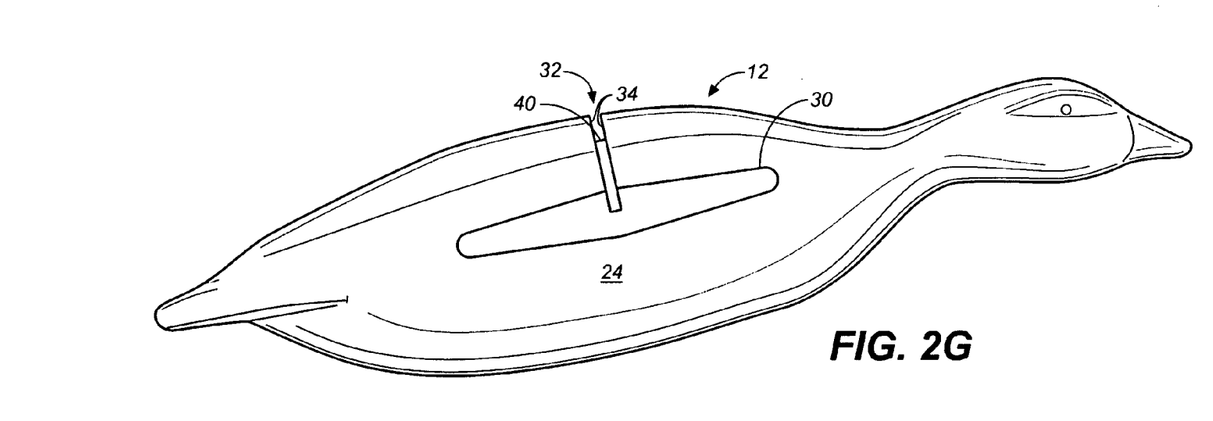
FIG. 2G is a side elevational view of the body of the flying bird replica without the wing members attached to it.

As shown in FIG. 2, the shape of the wing members 14 connotes the extended wing members of a bird in flight. Each wing member 14 comprises a proximate portion 56 near the body 12, a narrower distal portion 58 extending outward and rearward from the proximate portion 56, and horizontally disposed top and bottom surfaces 62, 64. An aperture 60 extends from the top surface 62 to the bottom surface 64 of the proximate portion 56 of the wing member 14. See also FIG. 2C. The forward edges 66, 68 of the proximate and distal portions 56, 58, are smooth and rounded giving the wing members 14 a realistic configuration and good aerodynamic properties. The back edge 70 of the proximate portion 56 of the wing member 14 is also smooth and rounded. The back edge 72 of the distal portion 58 is ridged or crenulated to represent the feathers of a bird. With additional reference to FIG. 2D, an insert 74 extending inwardly from the inner face 76 of the proximate portion 56 of each wing member 14 has horizontally disposed upper and lower insert walls 57 that are shaped and sized to closely conform to the receiving walls 31 of the wing opening 30 such that the insert 74 fits snugly and removably into the wing opening 30 on the body 12. The inner face 76 abuts the side of the body 12 surrounding the wing opening 30 so as to limit the depth the insert 74 is embedded in the wing opening 30. Aperture 60 is spaced distally from the inner face 76 of the proximate portion of the wing member 14. A small conduit 78 extends from the vertically disposed outwardly facing inner wall 80 of the aperture 60 to the interior edge 82 of the insert 74 for accommodating flexible cord 84 which interconnects the wing members 14, as shown in FIG. 2C. Each end of the cord 84 is secured in each aperture 60 by placing a washer 86 on each end of the cord 84 and forming a knot 88 at the end of the cord 84 so that the washer 86 is disposed between the knot 88 and the inner wall 82 of the aperture 60. The insert 74 is thicker in its middle region, as shown in FIGS. 2 and 2D, to counteract any loss of strength due to conduit 78.

The body 12 and wing members 14 are constructed of a flexible and light-weight material that allows the replica 10 to move in a manner similar to a bird in flight upon exposure to air flow or wind currents. In one embodiment, the body 12 and wing members 14 are constructed from Expanded Polypropylene Particle (EPP) foam, but other materials that allow the replica to perform in a reasonably life-like manner may also be used.

In the embodiments illustrated in FIGS. 2E-2F, support apparatus 16 comprises a relatively rigid rod 90 having a vertical portion 92 and a horizontal portion 94. The horizontal portion of rod 94 extends through the channel 44 in the body 12, holding the channel 44 in a substantially horizontal position and providing a horizontal axis about which the body 12 and wing members 14 may freely rotate, as depicted in FIG. 3B. The vertical portion 92 of rod 90 is freely received in the vertical top bore 96 of the top portion of post 98 or other support member anchored in the ground, providing thereby a vertical rotational axis for the side-to-side pivoting motion shown in FIG. 3A responsive to wind currents indicated by the arrows.

Referring to the embodiment in FIG. 2E, the horizontal portion 94 of the rod 90 has two annular grooves 102*f*, 102*r*, as shown in FIG. 2. The front and rear grooves 102*f*, 102*r*. are spaced apart by a distance slightly greater than the length of the tube 50. With the horizontal portion 94 of the rod 90 inserted through the tube 50 in the channel 44, two washers 118 are positioned on the rod 90 such that each washer 118 is between one of the tube ends and one of the grooves 102. An e-clip 104 inserted into each groove 102*f*, 102*r*. minimizes longitudinal movement of the horizontal portion 94 of the rod 90 in the tube 50.

The embodiment illustrated in FIG. 2F does not have a tube 50 that lines channel 44. Instead, in this embodiment, the support apparatus 16 comprises forward and rear sleeves 106, 108 press-fit inside channel 44 from the forward and rear openings 46, 48, respectively. Forward and rear sleeves 106, 108 each have an inner diameter slightly larger than rod 90 such that forward sleeve 106 closely surrounds rod 90 adjacent forward opening 46, and rear sleeve 108 closely encircles rod 90 adjacent rear opening 48. Rod 90 is thus confined against excess lateral movement yet pivots freely in sleeves 106, 108. Forward retaining collar 110 is removably press fitted over rod 90 immediately in front of forward sleeve 106 and rear retaining collar 112 is removably press fitted over rod 90 immediately behind rear sleeve 108, thereby confining rod 90 against longitudinal movement with respect to sleeves 106, 108 and, hence, body 12. It will be understood that a single support assembly 16 can support more than one bird replica 10.

Figure 5:
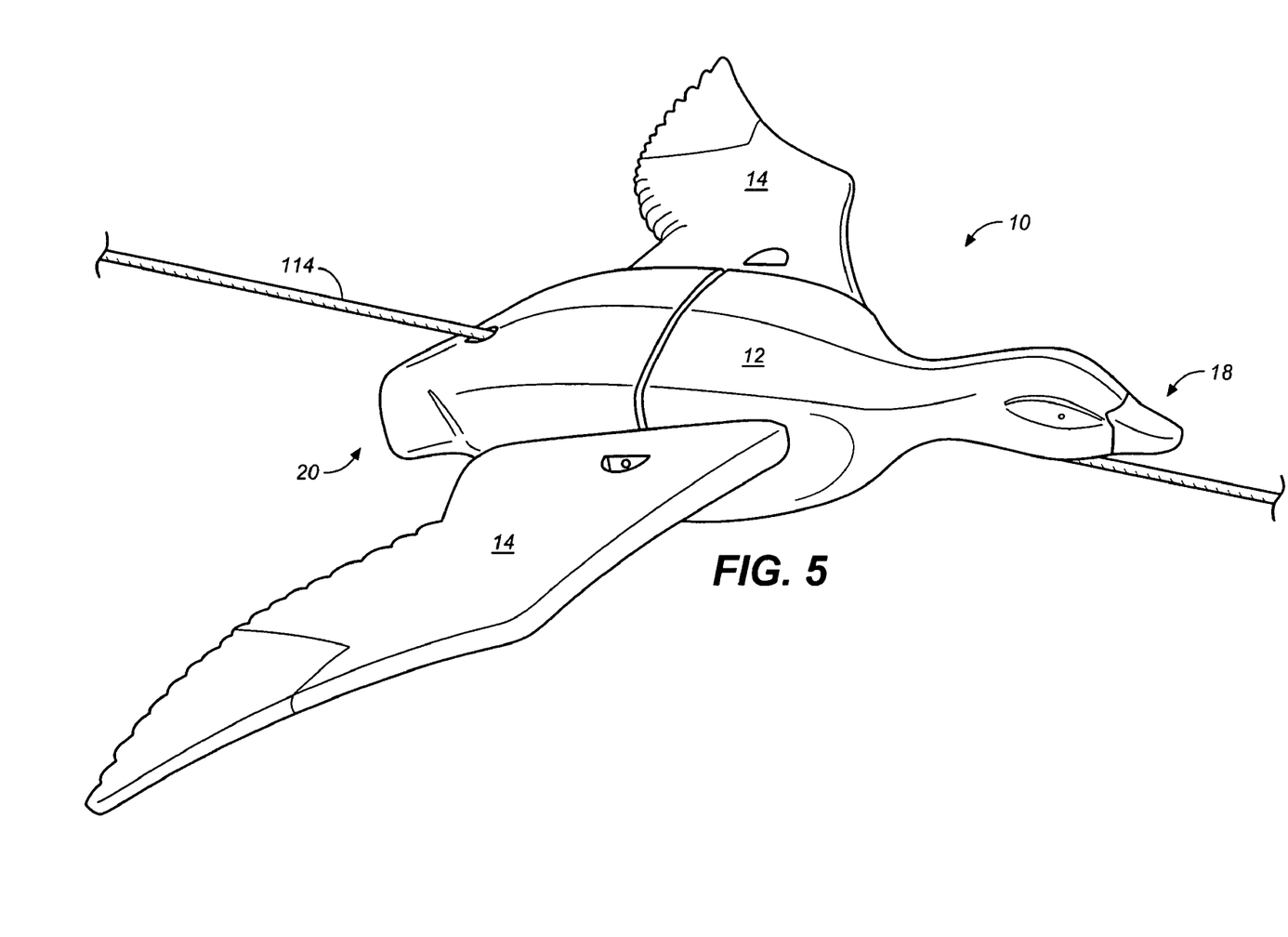
FIG. 5 is an upper perspective view of another embodiment of a flying bird replica supported by a cord or string according to the invention.
Figure 6:
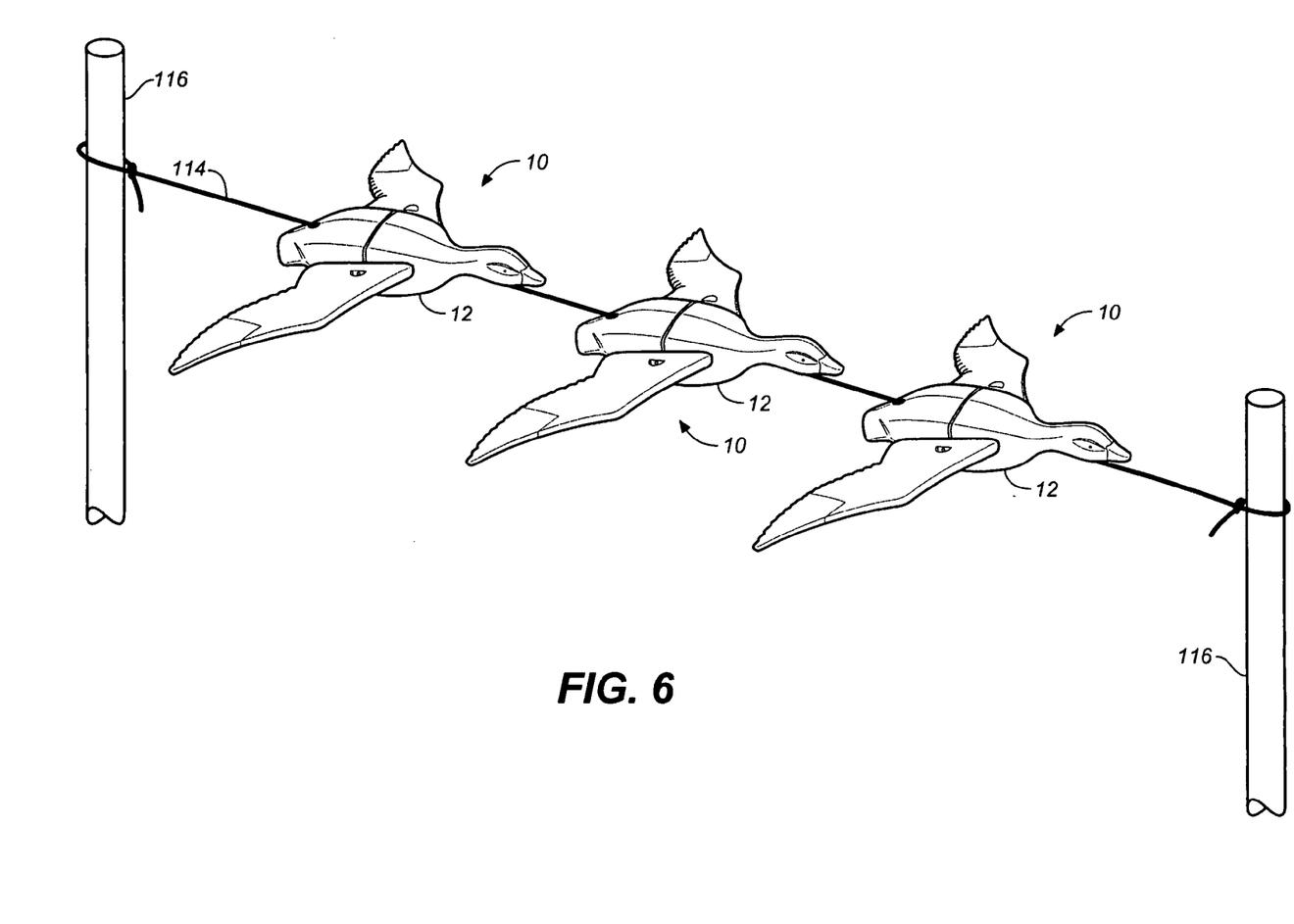
FIG. 6 is an upper perspective view of a plurality of the flying bird replicas shown in FIG. 5 supported by a cord or string extending between two supports.

In an alternate embodiment of a flying bird replica 10 illustrated in FIGS. 5-6, the support apparatus 16 for one or more replicas 10 is provided by a cord or string 114 suspended between two supports 116 anchored to a ground surface. The string 114 passes through the channel 44 of each replica 10 and is secured in place relative to the body 12 of each replica 10 using the sleeve and retaining collar arrangement described above or by any other practical means.

Figure 2H:
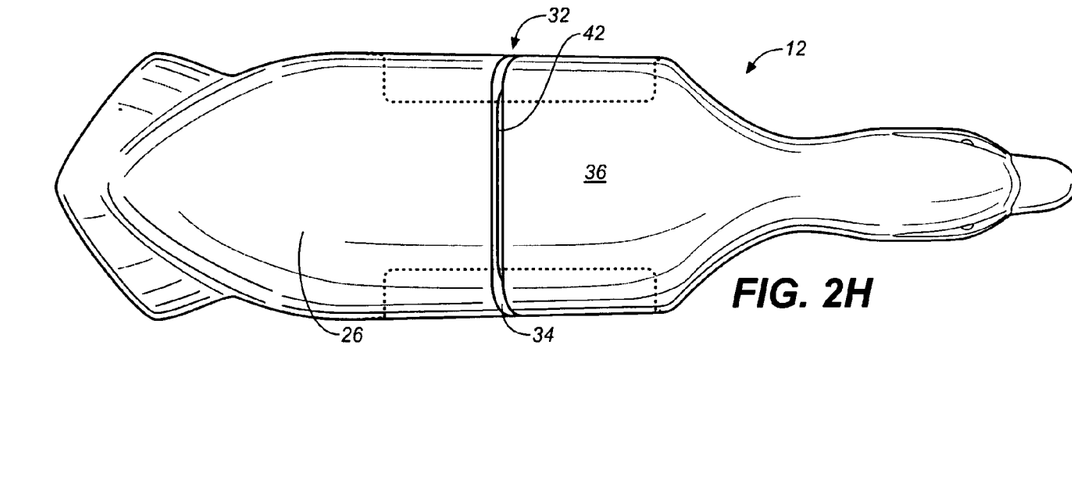
FIG. 2H is a top plan view of the body of the flying bird replica shown in FIG. 2G.

Assembly of the bird replica 10 in the field is remarkably quick and easy. When the cord is in a stretched state, the maximum spacing between the inner faces 76 of the proximate portions 56 of the wing members 14 is less than the distance between the sides 22, 24 of the body 12. Further separation of the wing members 14, as shown in FIG. 2A, therefore stretches and puts the cord 84 under tension. With the wing members 14 held apart an adequate distance, the inserts 74 are then inserted in the wing openings 30 on the sides 22, 24 of the body 12 as shown in FIG. 2B, while the flexible cord 84 between the wing members 14 is guided into the slot 32 in the upper side 26 of the body 12, shown in FIGS. 2G-2H. With the inserts 74 fully seated in wing openings 30, the stretched cord 84 pulls the wing members 14 together thereby retaining the inserts 74 in the wing openings 30 and holding the wing members 14 in a fixed position relative to the body 12. See FIGS. 2A, 2B. As perhaps best seen in FIG. 2, the wing openings 30 are angled with respect to the longitudinal axis of the bird body 12. Therefore, when the wing members 14 are attached to the body 12, the forward edge 66 of the wing members 14 is higher than the back edge 72 giving a realistic appearance to the assembled replica 10.

To secure the body 12 to the support rod 90 in the embodiment illustrated in FIG. 2E, the horizontal portion 94 of the rod 90 is inserted through the channel 44 such that groove 102*r*. extends from rear opening 48. Washers 118 are positioned on each end of the rod 90 such that one washer 118 is between an annular groove 102*r*. and the rear end 54 of the tube 50 and the other washer 118 is between forward opening 46 and the corner between the vertical and horizontal sections 92, 94 of the rod 90. An e-clip 104 is inserted into groove 102*r*.. Then the rod 90 is pulled forward such that the horizontal portion 94 is drawn through channel 44 toward the head end 18 of the body 12 until the washer abuts the rear end 54 of the tube 50 inside channel 44. The other washer 118 is then moved between the front end 52 of tube 50 and groove 102*f*, and the remaining e-clip 104 is inserted into groove 102*f*.. The washer 118 and e-clip 104 combination adjacent each end of tube 50 restricts longitudinal movement of the body 12 along rod 90. The vertical portion 92 of rod 90 is then inserted into vertical bore 96 of post 98 to establish the vertical rotational axis.

In the embodiment illustrated in FIG. 2F, forward and rear sleeves 108, 110 are press-fit into channel 44 from the forward and rear openings 46, 48 of the channel 44, respectively. The forward retaining collar 110 is slid onto the horizontal portion 94 of the rod 90 towards vertical section 92. Then horizontal portion 94 of the rod 90 is inserted through channel 44 such that it passes through sleeves 108, 110 and extends from rear opening 48. The rear retaining collar 112 is positioned on horizontal portion 94 and both the front and rear retaining collars 110, 112 are slid along horizontal portion 94 to the positions shown in FIG. 2F to restrict longitudinal movement of the body 12 along rod 90. The vertical section 92 of rod 90 is then inserted into the bore 96 of support post 98.

One great advantage of the invention is that the entire assembly process for the described embodiments can take less than one minute.

Figure 3A:
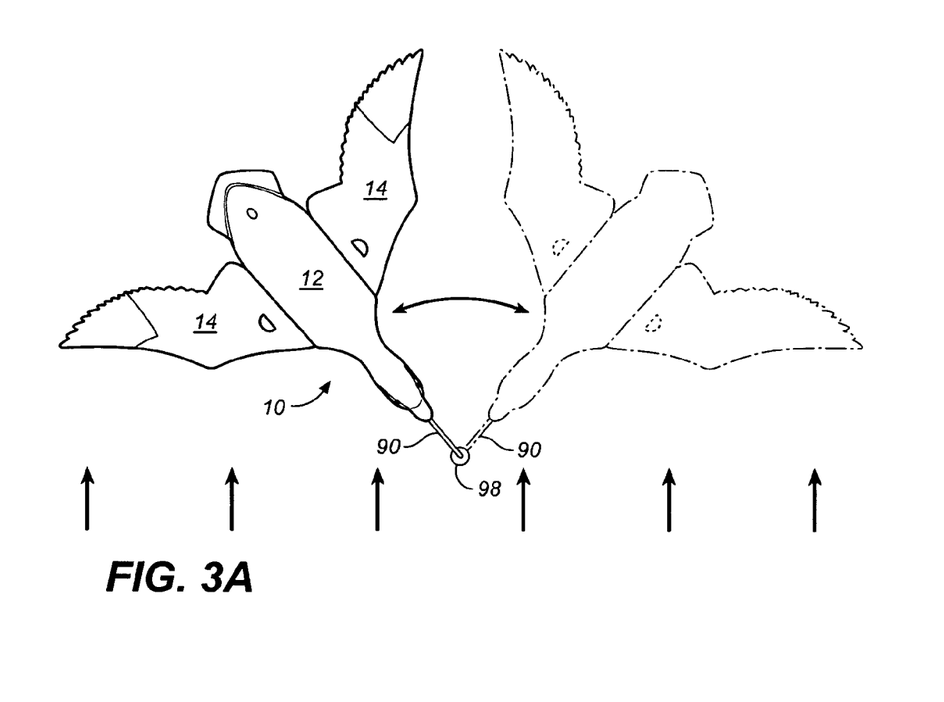
FIG. 3A is a top plan view of the bird replica shown in FIG. 1A, rotating about a vertical axis formed by a rigid support member according to the invention.
Figure 3B:
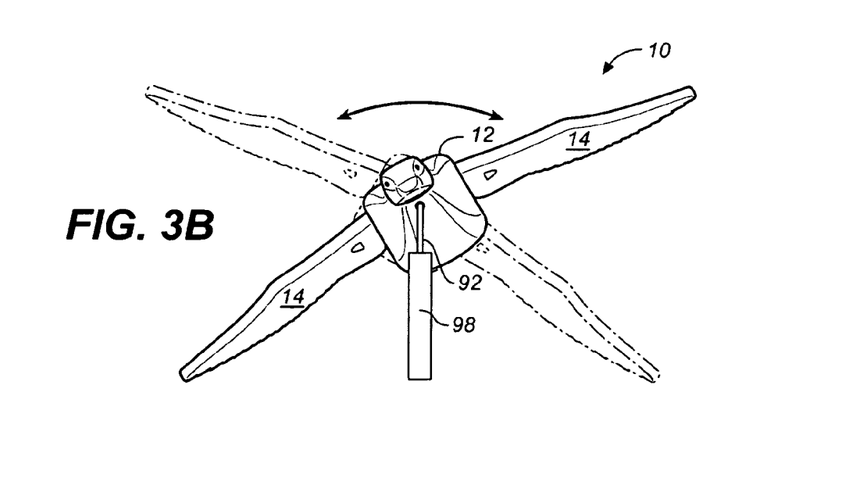
FIG. 3B is a front elevational view of the bird replica shown in FIG. 1A, rotating about a horizontal axis formed by a rigid support rod according to the invention.

When exposed to wind or air currents as indicated by the arrows in FIG. 3A, the bird replica 10 swings to face into the direction of the air flow, thereby indicating the direction of the wind like a weathervane. Moreover, the body 12 rocks reciprocally from side-to-side around the horizontal axis formed by the horizontal portion 94 of the rod 90 as shown in FIG. 3B. Since its center of gravity is below support rod 90, the replica 10 tends to return to center from any tilted position and, although it is possible, the replica 10 is unlikely to completely overturn. The upward cant of the body 12 and wing members 14, combined with the swinging motion and the side-to-side rocking motion, creates a convincing imitation of a bird in flight.

Figure 4:
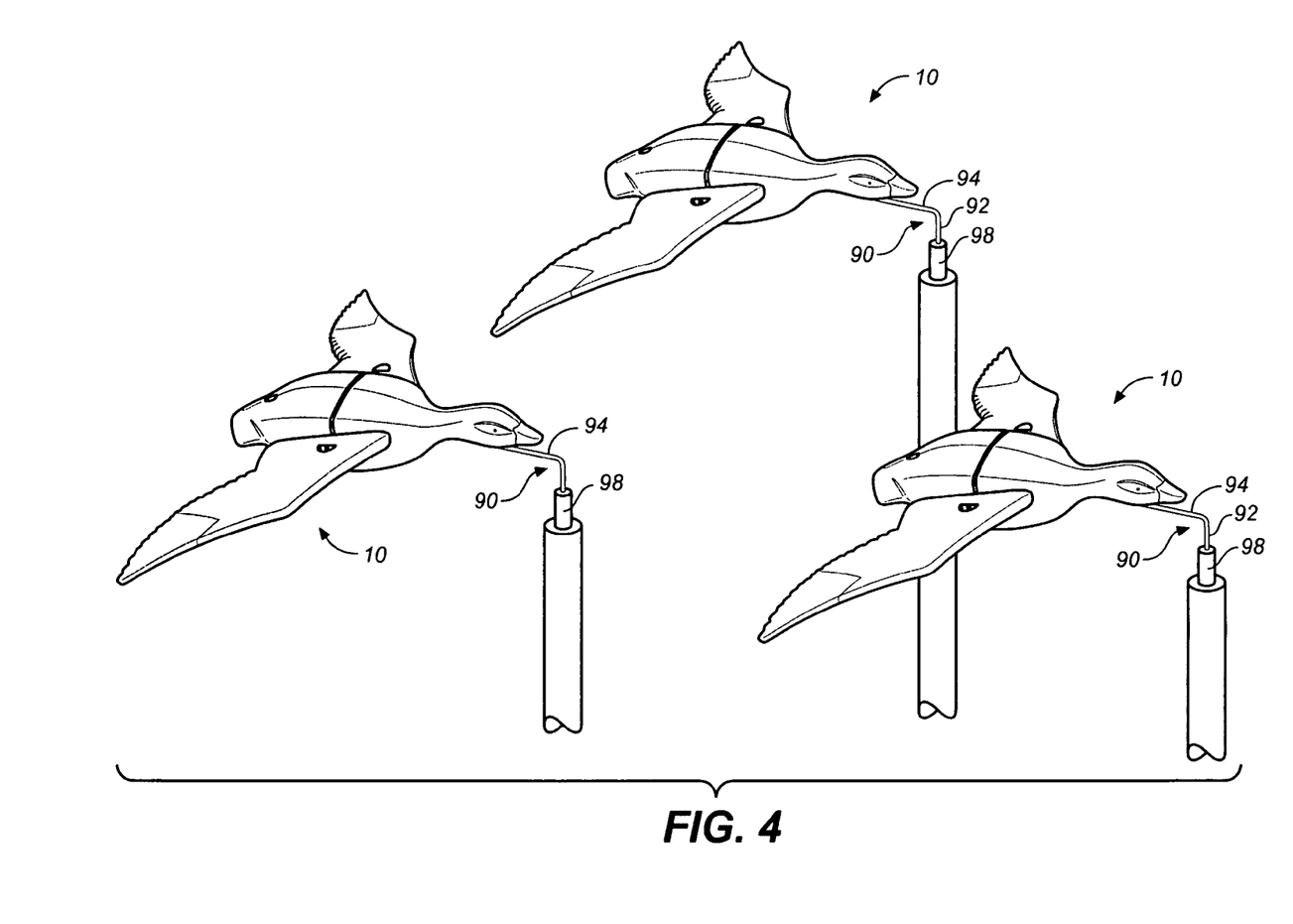
FIG. 4 is an upper perspective view of a plurality of flying bird replicas arranged in a flock-like flying formation.

FIG. 4 illustrates a plurality of flying bird replicas 10 of the type discussed above arranged in the classic V-shaped flying pattern of a group of waterfowl.

Given that wind may not always be available, it is contemplated that in another embodiment, the bird replica 10 may comprise a battery-operated motor operatively connected to support rod 90 that rocks the body 12 from side-to-side regardless of wind conditions.

While certain embodiments of a flying bird replica have been described and illustrated, it will be recognized and appreciated by those skilled in the art that modifications thereof are within the spirit and scope of the invention. The following claims are intended to cover all such modifications.

I claim:

1. A flying bird replica comprising:
an elongated body resembling a bodily form of a bird, said body having a top surface, two sides and a transverse cord-receiving slot said slot having two opposing planar side walls and a floor, said side walls extending downwardly from the top surface of said body and between the two sides thereof, said floor extending between said side walls, and
a pair of detachable wing members extending from said sides, each said wing member having a proximate portion having an inner face, said inner face abutting one of the sides of the body, said wing members interconnected by a stretchable cord disposed below said top surface in said slot, said cord having an unstretched state and a stretched state, in said unstretched state the maximum separation between the inner faces of said wing members is less than a distance between the sides of said body, in said stretched state said cord pulling said wing members together,
wherein, when the inner faces of said wing members are in abutting relation with the sides of said body, said cord is in said stretched state such that said wing members are urged by said cord toward each other and against the sides of said body.

2. The flying bird replica of claim 1 wherein:
said floor having two outer ends adjacent said sides of said body and a middle section between said outer ends, said floor higher at said middle section than at said outer ends.

3. The flying bird replica of claim 1 further comprising:
a pair of elongated wing openings, each wing opening extending longitudinally along one of said sides of said body and having horizontally disposed top and bottom receiving walls extending inwardly from said one of said sides, said slot having two opposite outer ends adjacent the sides of said body, said wing openings intersecting said outer ends, and
each of said wing members having an insert, said insert having horizontally disposed upper and lower insert walls extending from said inner face and shaped and sized to closely conform to the receiving walls of one of said wing openings, each said insert snugly and removably received in one of said wing openings,
wherein said cord urges said inserts of said wing members into said wing openings.

4. The flying bird replica of claim 3 further comprising:
each of said wing members having horizontally disposed planar top and bottom surfaces and an aperture extending between said top and bottom surfaces, said aperture having a vertically disposed outwardly facing inner wall spaced distally from the inner face of said wing member, said insert having an interior edge,
each of said wing members having a conduit disposed between said top and bottom surfaces of said wing member, said conduit forming a closed passageway for said cord and extending between said inner wall of said aperture and said interior edge of said insert,
said cord having two opposite ends, each end disposed in the conduit and extending into the aperture of one of said wing members, and
means for holding the ends of said cord in said apertures.

5. The flying bird replica of claim 4 wherein:
each end of said cord is disposed between said top and bottom surfaces of one of said wing members.

6. The flying bird replica of claim 4 wherein:
said means for holding comprises a knot at each of said ends of said cord and a washer on said cord disposed between each knot and said inner wall of one of said apertures.

7. The flying bird replica of claim 1 further comprising:
a channel extending longitudinally through said body, said channel coincident with a plane bisecting said body into lateral halves, and
support means rotatably received in said channel for holding said channel in substantially horizontal orientation and for forming a horizontal axis of rotation, said body freely rotatable about said axis.

8. The flying bird replica of claim 7 further comprising:
a wear-resistant tube lining said channel.

9. The flying bird replica of claim 8 wherein:
said tube has a rearward end disposed in said channel below said top surface of said body.

10. The flying bird replica of claim 8 wherein:
said body comprises expanded polypropylene particles and said tube is non-rotatably attached in said channel to said body.

11. The flying bird replica of claim 7 wherein:
said support means is a string.

12. The flying bird replica of claim 7 wherein:
said channel is coincident with a plane bisecting said body into upper and lower portions, and said lower portion is heavier than said upper portion such that upon rotation of said body about said channel said body tends to stabilize with said upper portion above said lower portion.

13. A flying bird replica comprising:
an elongated body resembling a bodily form of a bird, said body having a top surface, two sides, a transverse slot extending between said sides, a head end, a tail end and a longitudinal axis extending between said head and tail ends,
a pair of wing members extending from said sides, said wing members interconnected by a flexible cord disposed below said top surface in said slot, said cord tensioned for urging said wing members together such that said wing members are held in fixed position relative to said body,
a channel extending longitudinally through said body, said channel coincident with a plane bisecting said body into lateral halves, and said channel disposed angularly relative to the longitudinal axis of said body such that said body and said wing members are held in a posture resembling a flying bird, and
support means received in said channel for holding said channel in substantially horizontal orientation, said body freely rotatable about said support means.

14. The flying bird replica of claim 13 wherein:
an approximate angular disposition of said channel with respect to said longitudinal axis is between 5 and 15 degrees.

15. A flying bird replica comprising:
an elongated body resembling a bodily form of a bird, said body having a top surface, two sides and a transverse slot extending between said sides,
a pair of wing members extending from said sides, said wing members interconnected by a flexible cord disposed below said top surface in said slot, said cord tensioned for urging said wing members together such that said wing members are held in fixed position relative to said body,
a channel extending longitudinally through said body, said channel coincident with a plane bisecting said body into lateral halves,
a rigid rod having a horizontal portion and a vertical portion, said horizontal portion received in said channel such that said body is freely rotatable about said horizontal portion, and
a post having a top portion having a top bore, said vertical portion of said rod rotatably received in said top bore, said top bore defining a vertical rotational axis for pivoting motion of said body about said post, said post for anchoring vertically in the ground.

16. The flying bird replica of claim 15 further comprising:
a wear-resistant tube non-rotatably attached to said body in said channel, said tube having opposite tube ends and a length, and
said horizontal portion of said rod rotatably received in said tube, said horizontal portion having two annular grooves spaced apart by a distance slightly greater than said length of said tube, two washers each positioned between one of said tube ends and one of said grooves, an e-clip removably inserted in each of said annular grooves thereby restricting longitudinal movement of said horizontal portion of said rod in said tube.

17. The flying bird replica of claim 15 further comprising:
means for securing said body against substantial longitudinal movement along the horizontal portion of said rod.

18. A flying bird replica comprising:
an elongated body resembling a bodily form of a bird, said body having a top surface, two sides and a transverse slot extending between said sides, each of said sides having a longitudinally extending recess intersecting said slot, and
a pair of wing members extending from said sides, each of said wing members having a proximate portion having an inner face and an insert extending inwardly from said inner face, said insert removably received in one of said recesses, said inner face abutting one of said sides of said body around said recess limiting penetration of said insert into said recess, said wing members interconnected by a flexible cord disposed below said top surface in said slot, said cord tensioned for urging said wing members against said sides of said elongated body and for holding said inserts in said recesses such that said wing members are held in fixed position relative to said body,
each of said wing members having top and bottom surfaces and an aperture extending between said top and bottom surfaces, said aperture having an inner wall,
said insert having an interior edge,
each of said wing members having a conduit disposed between said top and bottom surfaces of said wing member, said conduit extending between said inner wall of said aperture and said interior edge of said insert,
said cord disposed in said conduits,
means for holding one end of said cord in each of said apertures,
a channel extending longitudinally through said body, said channel coincident with a plane bisecting said body into lateral halves, and
support means received in said channel for holding said channel in substantially horizontal orientation, said body freely rotatable about said support means.

19. A flying bird replica comprising:
an elongated body resembling a bodily form of a bird, said body having a top surface, two sides and a transverse slot extending between said sides, a head end, a tail end and a longitudinal axis extending between said head and tail ends, each of said sides having a longitudinally extending recess intersecting said slot,
a pair of wing members extending from said sides, each of said wing members having a proximate portion having an inner face and an insert extending inwardly from said inner face, said insert removably received in one of said recesses, said inner face abutting one of said sides of said body around said recess limiting penetration of said insert into said recess, said wing members interconnected by a flexible cord disposed below said top surface in said slot, said cord tensioned for urging said wing members against said sides of said body and for holding said inserts in said recesses such that said wing members are held in fixed position relative to said body,
each of said wing members having top and bottom surfaces and an aperture extending between said top and bottom surfaces, said aperture having an inner wall,
said insert having an interior edge,
each of said wing members having a conduit disposed between said top and bottom surfaces of said wing member, said conduit extending between said inner wall of said aperture and said interior edge of said insert,
said cord disposed in said conduits,
means for holding one end of said cord in each of said apertures, a channel extending longitudinally through said body, said channel coincident with a plane bisecting said body into lateral halves, said channel disposed angularly relative to said longitudinal axis such that said body and said wing members are held in a posture resembling a flying bird, a wear-resistant tube non-rotatably attached to said body in said channel, said tube having opposite tube ends and a length, a rigid rod having a horizontal portion and a vertical portion, said horizontal portion received in said tube for holding said channel in substantially horizontal orientation, said body freely rotatable about said horizontal portion, said horizontal portion having two annular grooves spaced apart by a distance slightly greater than said length of said tube, two washers each positioned between one of said tube ends and one of said grooves, an e-clip removably inserted in each of said annular grooves thereby restricting longitudinal movement of said horizontal portion of said rod in said tube, and a post, said post having a top portion including a top bore, said vertical portion of said rod rotatably received in said top bore, said top bore defining a vertical rotational axis for pivoting motion of said body about said post, said post for anchoring vertically in the ground.

* * * * *